Nov. 11, 1941.     C. E. NORTON     2,262,037
ELEVATING TRUCK
Filed Jan. 27, 1939
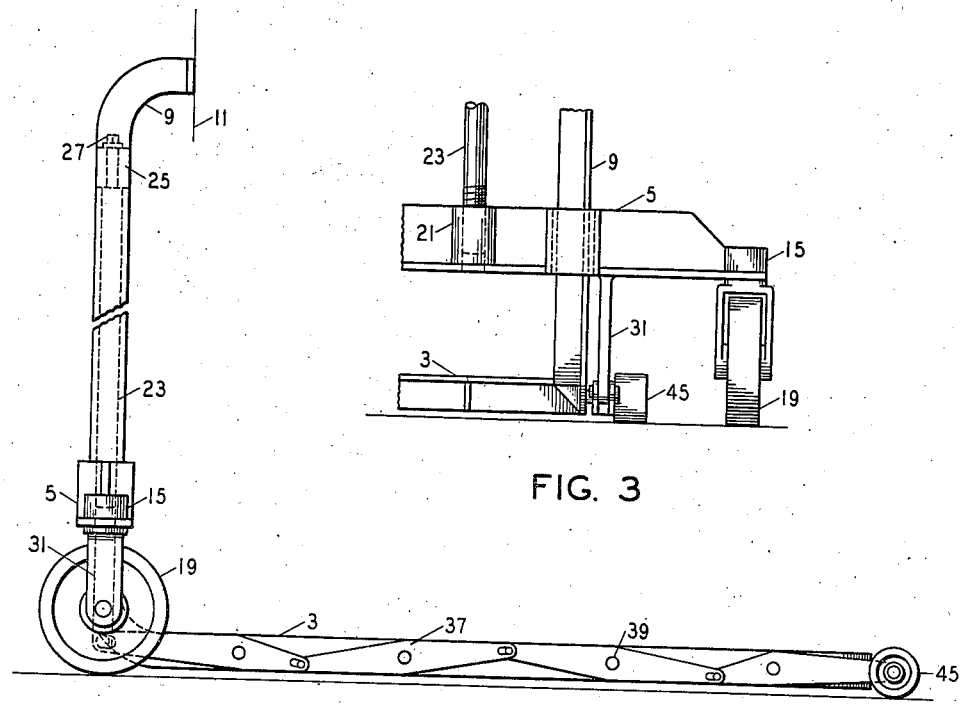
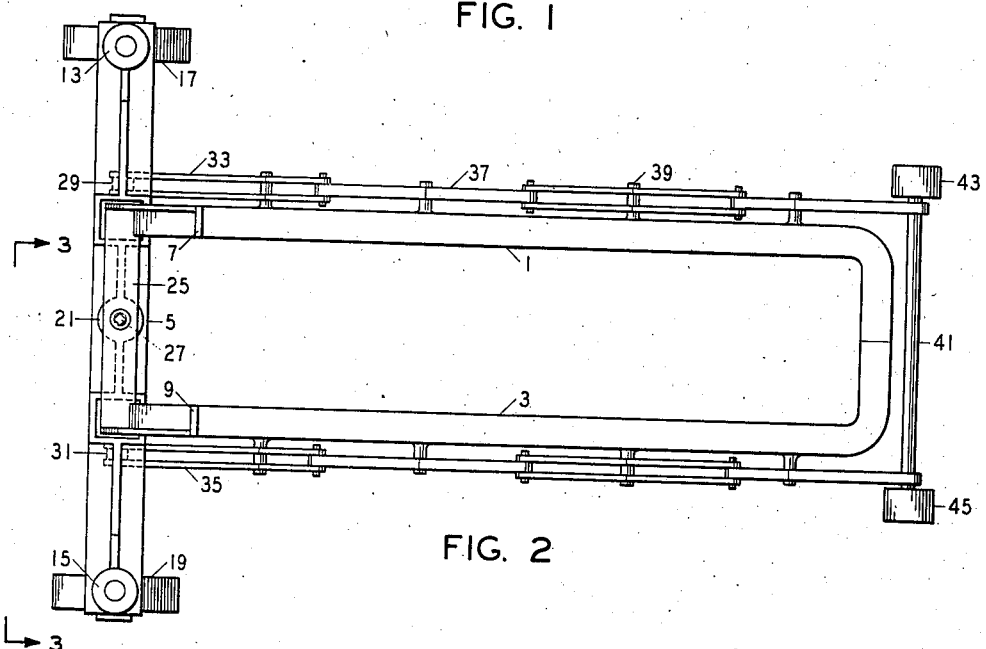
Columbus E. Norton
INVENTOR
BY Arthur L. Davis
ATTORNEY Patented Nov. 11, 1941

2,262,037

UNITED STATES PATENT OFFICE 2,262,037

ELEVATING TRUCK

Columbus E. Norton, Knoxville, Tenn.

Application January 27, 1939, Serial No. 253,145

3 Claims. (Cl. 254—7)

(Granted under the act of March 3, 1883, as amended April 30, 1928; 370 O. G. 757)

The invention herein described may be manufactured and used by or for the Government for governmental purposes without the payment to me of any royalty thereon.

This invention relates to an improvement in elevating trucks adapted to lift a load vertically and move the same to a distant location.

The principal object of this invention is to provide a load elevating means adapted to be operated in a substantially limited space beneath the unelevated load. Another object of this invention is to provide an elevating truck with a load supporting frame not susceptible to longitudinal movement as said frame is being elevated. A further object of this invention is to provide an elevating truck wherein the load supporting frame is capable of having a pressure exerted externally applied substantially uniformly to both sides of the frame. Other objects of this invention include the provision of an elevating truck for operation within a limited clearance which is adapted to be manufactured economically, including rapid assembly, and adapted to convenient operation.

Many types of elevating trucks have been provided for the raising and transporting of a great variety of loads. All such trucks as have hitherto been proposed consist of elements in such combination that the load to be subsequently elevated must initially rest at a substantial elevation above that from which the truck itself operates. By virtue of the character of construction employed it is not possible to use any of such trucks for the elevation of loads which have a substantially limited clearance, such as is the case with files, where the clearance is on the order of 1" to 2".

In the present invention the elevating truck comprises the combination of a load supporting frame, extended members on said frame and a cross member integral with said extended members, a truss member supported by at least one front wheel and adapted to receive said extended members, a plurality of levers mounted on each side of said frame and supported by a rear wheel, adapted to coact with said truss member, and a rotatable member engaged with said truss member and said cross member adapted to raise said frame vertically by the rotation of said member.

In the accompanying drawing which shows one form of apparatus for the embodiment of my invention Fig. 1 is a side elevational view of an elevating truck, Fig. 2 is a plan view of the apparatus shown in Fig. 1, and Fig. 3 is a partial front elevational view taken on lines 3—3 of Fig. 2.

In Fig. 1, Fig. 2 and Fig. 3 a load supporting means of the truck is shown as a load supporting frame consisting of two parallel side members 1 and 3 which may be made of angle iron and may consist of one member if so desired. The paralel members 1 and 3 extend up through and are slidable within a supporting member 5 and said extended members form handles, 7 and 9, respectively, the return of which rests firmly against the load, represented by line 11, to insure rigidity. The supporting member 5 is provided, at one end with a boss 13 and at the other end with a boss 15 to receive respectively the wheel mounts for wheels 17 and 19 which are provided with anti-friction bearings to facilitate steering. At the center of the member 5 another boss 21 is provided to receive a shaft 23 which on the one end screws into the boss 21 and on the other end bears against and extends through a cross member 25 which is integral with the handles 7 and 9. The portion of the shaft 23 which extends through cross member 25 is provided with a fitting 27 which may be operated by a standard ratchet wrench (not shown). A strut 29 and a strut 31, integral with and beneath the member 5, are affixed to levers 33 and 35 respectively which in turn are connected to a plurality of levers, represented by lever 37, each of which has a fulcrum, represented by fulcrum 39, integral with the load supporting frame members 1 and 3. A shaft 41 extends through the last pair of levers and provides a support for the wheels 43 and 45. In operating the elevating truck the load supporting frame is placed beneath the load and the shaft 23 is unscrewed thereby distending its effective length and thereby causing the front end of the frame member 1 and 3 to be elevated. As the front end of said frame members are elevated, struts 29 and 31 coact with the plurality of levers on each side of said frame so that the entire frame from front to rear is simultaneously raised. To return the frame to its initial position it is necessary to shorten the effective length of the shaft 23 by screwing the shaft in the opposite direction.

It is evident that there are numerous factors which will influence conditions for the most satisfactory operation of my invention, the actual limits of which cannot be established except by a detailed study of the conditions involved in each unusual character of operation.

Ordinarily elevating trucks are designed to have lifting elements for the load supporting frame consisting of cams, eccentrics, or levers which are located at each end of the truck. As the lifting elements and the load supporting frame are necessarily superposed on a wheel carriage, this type of construction necessitates considerable clearance beneath the load to be elevated in order that sufficient room is afforded to place the truck in position for subsequent elevation. Such concentrated loading of the elements at the ends of the load supporting frame requires a load supporting frame of reasonable depth and the moment arm operating the cam, eccentric, or lever must also be of considerable magnitude for effective operation.

In the present invention the load supporting frame and the plurality of levers affixed thereto coact in such a manner that when one end of the load supporting frame is raised the entire load supporting frame is elevated vertically with a uniform support along both sides of the load supporting frame. In this manner it is possible to provide an elevating truck of minimum height and one which, therefore, may be particularly adapted for use where the clearance between the base supporting the truck and the load to be subsequently elevated is quite small. It is, of course, necessary that the size of the structural members, particularly the system of levers and the load supporting frame, upon which they are mounted be compatible with the load they are lifting. When limited clearance is of paramount importance this may be best taken care of by utilizing a plurality of lever systems in accordance with the present invention whereby the load upon the supporting frame is uniformly distributed thereby substantially reducing the depth of the load supporting frame and accordingly reducing the clearance required for the operation of the truck.

In the preferred embodiment of this invention the operation is as follows: the front or rear wheel or wheels are normally retained in a position which provides a minimum clearance between the top of the load supporting frame and the floor; the truck is placed beneath a load to be supported; the screw shaft located between extended members of the load supporting frame, which also may serve as a lateral guide for the supported load, is extended thereby causing the load to be elevated vertically; the load supported by the truck is transported to a new location; and the screw shaft is returned to its initial position thereby lowering the load to the initial elevation.

It will be seen, therefore, that this invention actually may be carried out without departing from its spirit and scope, with only such limitations placed thereon as are imposed by the prior art.

I claim:

1. In an elevating truck, the combination of (a) a horizontal load supporting frame having vertical members integral therewith; (b) a truss member, supported by a wheel at each end having said vertical members extending therethrough; (c) a plurality of articulated levers mounted on each side of said frame supporting the frame substantially throughout the entire length with one end of each of said plurality of articulated levers connected to the truss adjacent to one of said vertical members and the other end of each of said plurality of articulated levers provided with a wheel; and (d) a rotatable member threadedly engaged with said truss members at one end and fixedly connected against axial movement with the vertical members at the other thereby lifting or lowering the frame as the rotatable member is unscrewed or screwed into the truss member.

2. In an elevating truck, the combination of (a) a horizontal load supporting frame having vertical members integral therewith; (b) a truss member supported by at least one front wheel having said vertical members extending therethrough; (c) a plurality of articulated levers mounted on each side of said frame supporting the frame substantially throughout the entire length with one end of each of said plurality of articulated levers connected to the truss adjacent to one of said vertical members and the other end of each of said plurality of articulated levers provided with a wheel; and (d) a rotatable member threadedly engaged with said truss member at one end and fixedly connected against axial movement with the vertical members at the other thereby lifting or lowering the frame as the rotatable member is unscrewed or screwed into the truss member.

3. In an elevating truck, the combination of (a) a horizontal load supporting frame having vertical members integral therewith; (b) a truss member supported by at least one front wheel having said vertical members extending therethrough; (c) a plurality of articulated levers mounted on each side of said frame supporting the frame substantially throughout the entire length with one end of each of said plurality of articulated levers connected to the truss adjacent to one of said vertical members and the other end of each of said plurality of articulated levers provided with a wheel; and (d) an actuating mechanism engaging said truss member and said vertical members adapted to lift or lower the frame.

COLUMBUS E. NORTON.